AUTOMATIC CHARGE METERING OF TELEPHONE CALLS

Filed Sept. 28, 1962 4 Sheets-Sheet 1

Inventors.
Günter Raab, 6,
Gerhard Polensky
By [signature] Atty.

Aug. 16, 1966 G. RAAB ET AL 3,267,216

AUTOMATIC CHARGE METERING OF TELEPHONE CALLS

Filed Sept. 28, 1962 4 Sheets-Sheet 2

Inventors.
Günter Raab &
Gerhard Polensky.
By [signature] Atty.

AUTOMATIC CHARGE METERING OF TELEPHONE CALLS

Filed Sept. 28, 1962 4 Sheets-Sheet 3

Inventors.
Günter Raab, &
Gerhard Polensky
By [signature] Atty

Aug. 16, 1966 G. RAAB ET AL 3,267,216

AUTOMATIC CHARGE METERING OF TELEPHONE CALLS

Filed Sept. 28, 1962 4 Sheets-Sheet 4

Inventors.
Günter Raab, &
Gerhard Polensky.
By [signature] Atty 3,267,216

AUTOMATIC CHARGE METERING OF TELEPHONE CALLS

Günter Raab and Gerhard Polensky, Munich, Germany, assignors to Siemens & Halske Aktiengesellschaft, Berlin and Munich, Germany, a corporation of Germany Filed Sept. 28, 1962, Ser. No. 227,649
Claims priority, application Germany, Sept. 29, 1961, S 76,043
6 Claims. (Cl. 179—7.1)

Figure 2:
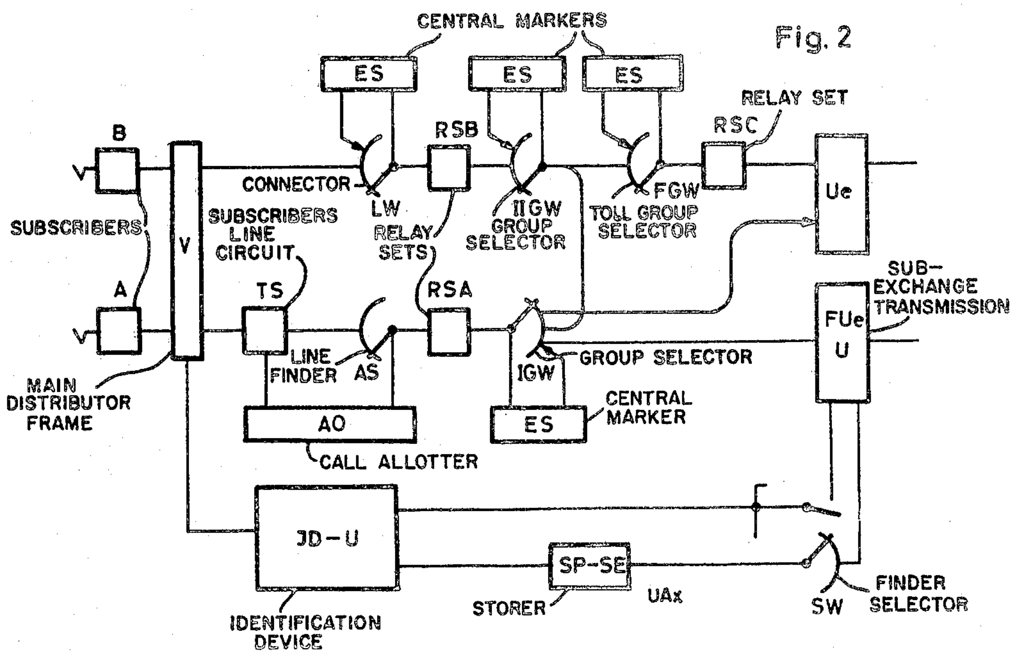

The invention disclosed herein is concerned with a circuit arrangement for automatic charge metering in telecommunication, and particularly telephone systems having main and sub-exchanges.

It is already known to provide in telephone systems means for automatic charge metering (ticketing) so as to furnish a written record, by a printing mechanism, of the number of unit calls, the time of the calls, the date, the telephone number of a subscriber to be charged, as well as other evaluation data. The identification of the individual subscribers who are to be debited with the charges incurred is generally effected by conducting an identification signal to the subscriber's line by way of a connecting device located in the connection path, for instance, central office transmission or toll line transmission, which signal is then tapped off over coupling members between the two line conductors and is evaluated by means of relay arrangements or toroidal core fields, or the like. The printing of the individual data is effected either while a call is in progress in, which case, the printing devices associated individually with the individual central office transmissions are connected during the entire duration of the corresponding connection, or else at the completion of a call, in which case a centrally arranged printing mechanism is connected for a short time to the individual central office and toll line transmissions when called for upon the release of the connection. In the latter case, the individual criteria are temporarily stored for the duration of the call. The operation is assured in the same manner in identification methods over special signal conductors, for instance, private conductors, also referred to as *c*-conductors.

In the case of groups of subscribers who are located at a relatively great distance from each other, it is frequently necessary to split the system up into a main exchange and a plurality of sub-exchanges, in which case the individual sub-exchanges are connected in general to the main exchange by way of a few sub-exchange transmissions.

In order to be able to likewise carry out the charge metering in these cases in simple manner, it is known to allocate to the respective exchanges individual identifying devices which are caused to determine the call number of a subscriber making a call and to transmit the result of the identification to a central printing device in the main exchange. The starting of the identification operation in the individual sub-exchanges takes thereby place after receipt of the outside telephone number dialed by the calling subscriber in the connected sub-exchange transmission of the main exchange.

Furthermore, it has already been proposed to use the identifying device of the printing main exchange also for the identification of the subscribers' stations in the sub-exchanges by causing the sub-exchange transmissions arranged in the main exchange and taking care of traffic from and to the individual sub-exchanges, as well as subscribers of the main exchange, to be determined by the identifying device present at the main exchange and by causing the sub-exchange transmission identified in each case, to effect over further switching means, the detection and transmission of the call number of the calling subscriber which applies within the sub-exchange.

Therefore, differing from the known arrangement, the entire call number marking a telephone station of a sub-exchange is no longer determined by the corresponding identifying device and transmitted to the main exchange, but merely the call number which applies within the sub-exchange in question, while the digits marking the corresponding sub-exchange are determined as a part of the number marking the station in question within the entire system, by the identifying device of the main exchange.

The present invention relates to a circuit arrangement for automatic charge metering or ticketing in telecommunication and particularly telephone systems comprising main and sub-exchanges, which operate in accordance with the method last mentioned above. This circuit arrangement is characterized by the fact that the marking points cooperatively associated with the individual sub-exchange transmissions are connected, within the identifying device associated with the main exchange, with another marking device, for instance toroidal core with evaluating device, relay, transistor or the like, and that the marking device affects the control of the operation of the identifying device so that only the number of digits is determined, which is established by the marking device for the number which marks the corresponding sub-exchange.

The marking devices connected with the marking points of the individual sub-exchange transmissions limit the additional load on the identifying device of the main exchange to a minimum, due to the inclusion of the sub-exchange transmissions, since the identifying process remains limited to a correspondingly few testing steps in order to determine a sub-exchange code, corresponding to the lower number of digits of the sub-exchange codes, as compared with the number of digits of the subscribers' stations of the main exchange.

Although a separate marking device is necessary for each different number of digits of the individual codes, the expenditure for the characterizing or marking device is in accordance with further features of the invention low as a result of the connection of the marking points having the same number of digits associated with the sub-exchange transmissions, with the same marking device.

Depending on the nature of the identifying methods used, several variants of the circuit arrangement in accordance with the invention are possible.

When using identifying devices with toroidal core evaluation fields, in which evaluating lops which are fixedly alloted to the individual marking points are linked with toroidal cores in accordance with the corresponding call number, and in which the identifying signal is given in the form of an alternating current over the line conductors, the evaluation loops connected with the marking points associated with the sub-exchange transmissions being connected, similar to the evaluation loops of the subscriber stations combined in the main exchange, with the corresponding toroidal cores of the number of decades of the toroidal core evaluation field corresponding to the number of digits of the sub-exchange code. With such a circuit arrangement, therefore, an individual evaluation loop must be provided in the toroidal core evaluation field for each sub-exchange transmission.

Another variant of the circuit arrangement in accordance with the invention is obtained by using identifying devices in which evaluation loops, in fixed association with the individual marking points, are linked in accordance with the corresponding call number and in which the identifying signal is simultaneously passed over the line conductors, or over a private conductor, for instance, a c-conductor of the trunk, by providing for the different marking of subscriber stations of the main exchange and of code numbers of sub-exchanges of the same initial sequence of numbers, only a single evaluation loop in the toroidal core evaluation field, and by connecting the marking points identifiable by the common evaluation loop by way of decoupling circuit members with the corresponding common evaluation loop. Such a circuit arrangement has the advantage over the first named arrangement, that no additional evaluation loops are necessary for the sub-exchange transmissions and that changes of sub-exchange codes can be effected without any change in the toroidal core evaluation field.

Figure 1:
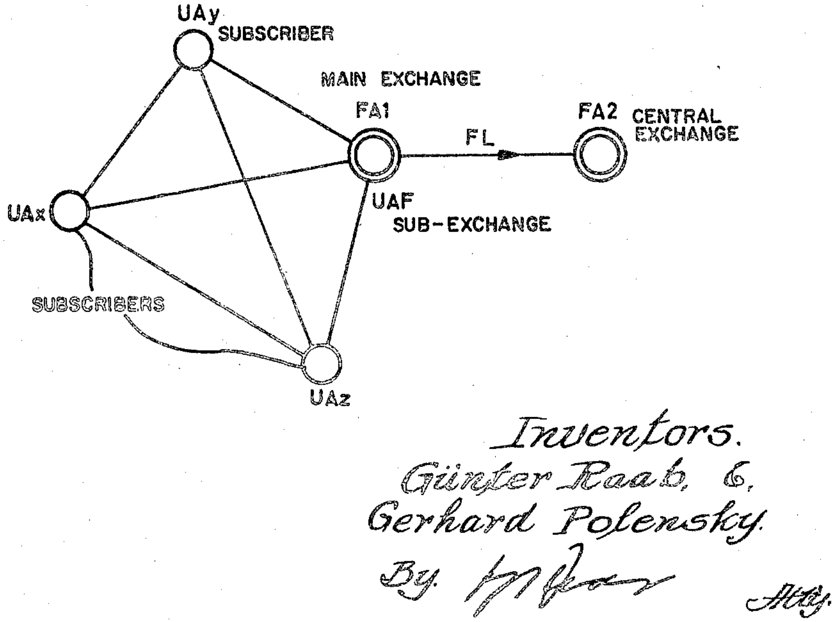
Figure 2A:
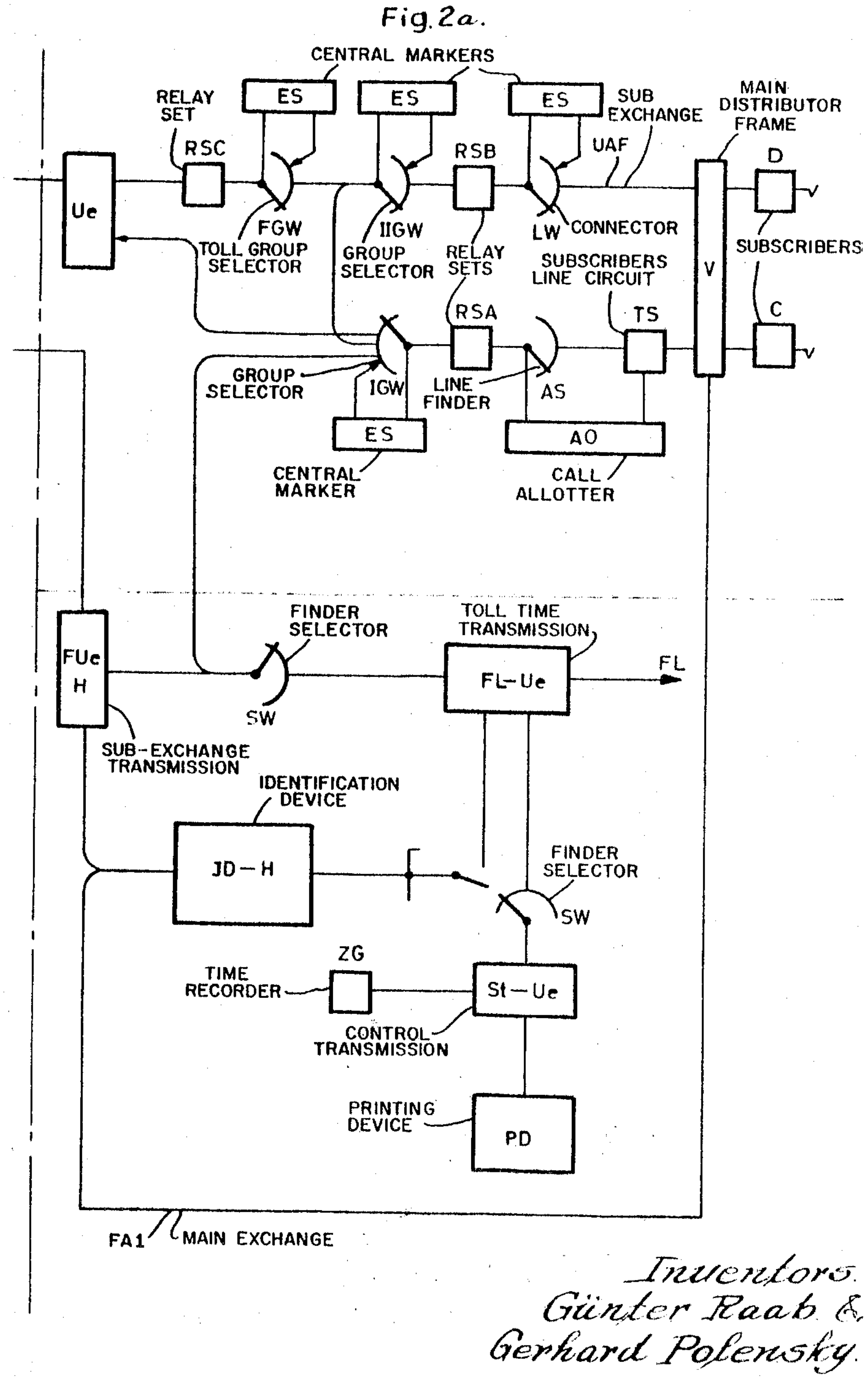
Figure 3:
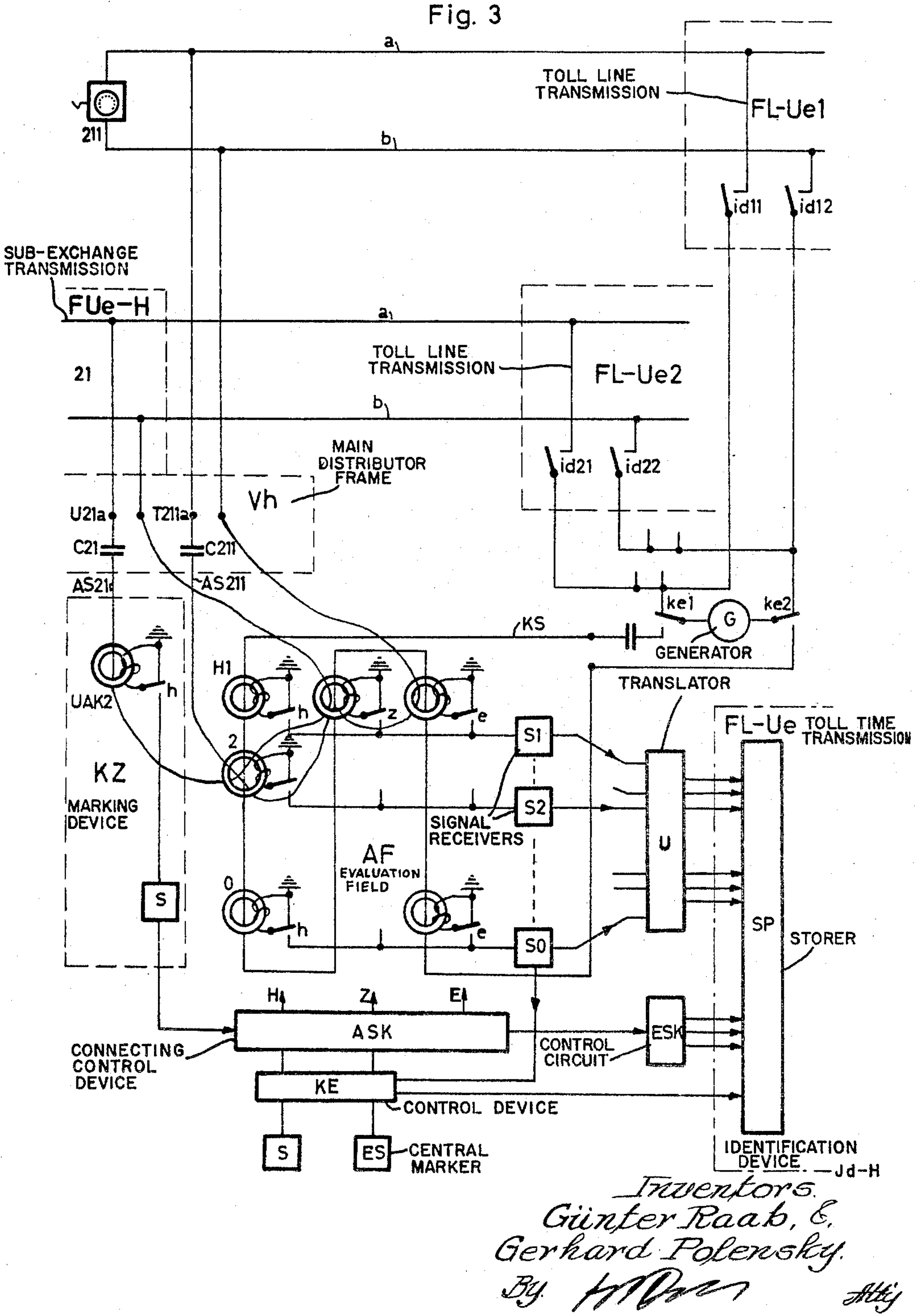
Figure 4:
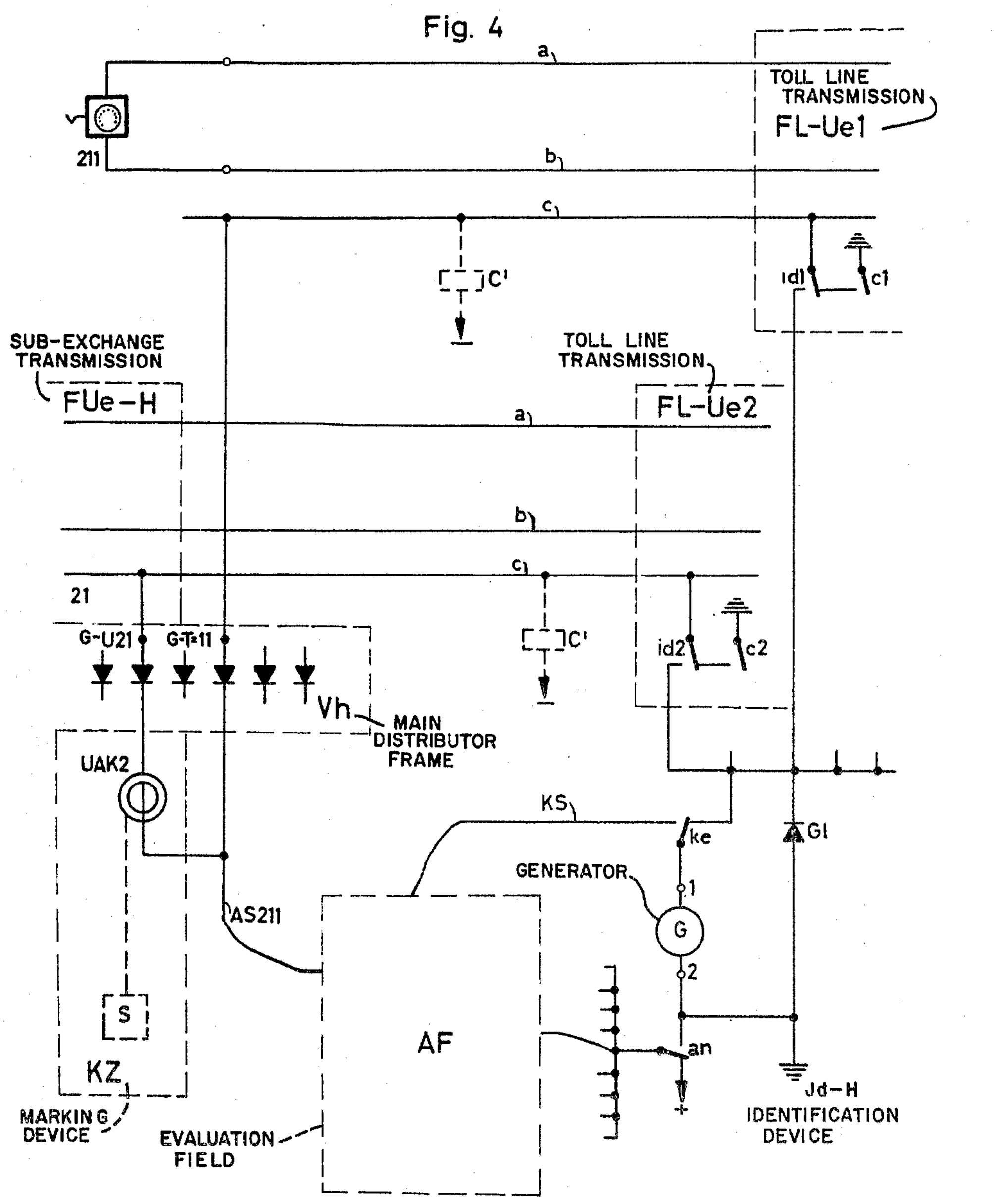

Further details of the invention are described below with reference to the accompanying drawings, in which, FIG. 1 shows the system of lines of a telephone system comprising main and sub-exchanges;

FIGS. 2 and 2*a* form a block diagram to show the manner of making connections within a sub-exchange, between two sub-exchanges, and from a sub-exchange to the toll line transmission;

FIG. 3 is an identifying device, modified in accordance with the invention, with signals given over the line conductors; and FIG. 4 shows a modified identifying device whereby signals are given over a private conductor of a trunk line.

The general view shown in FIG. 1 serves to make clear the traffic conditions possibly arising in a telephone system comprising sub- and main exchanges. UA*x* and UA*z* are individual sub-exchanges, while UAF is the sub-exchange at the place of the main exchange FA1, over which extends the entire toll traffic of the individual sub-exchanges with other central exchanges or offices, for instance over the toll line FL to the exchange FA2.

FIGS. 2 and 2*a* show the basic construction of the sub-exchanges UA*x* and UAF in combination with the devices for the outgoing traffic over the toll line FL. As example, there is selected a known system of selectors with central markers ES per selection stage. The course of operations upon the making of a connection within the sub-exchange—subscriber A for instance calls subscriber B—is, as known, as follows:

When the subscriber A removes his receiver and the corresponding subscriber line circuit TS is busied, the latter gives off a signal for the call allotter AO, which sets an idle line finder AS on the calling line, thereupon releasing again.

The line finder AS connects the calling subscriber A to the relay set RSA which in known manner takes care of the battery feed, applies the dial tone and further controls the extension of the call with its pulse repeater which serves for the storage and transmitting of the incoming dial pulses.

As soon as a complete train of dial pulses is present in the pulse repeater of the relay set RSA, a marker ES of the following selector stage is seized, therefore, first a marker of the group selector I.GW, which evaluates the digit sent out and effects the setting of the group selector in accordance with the marker principle. After the setting and connecting through of the call to the next group selector stage II.GW, there is effected the release of the marker ES in the group selector stage I.GW. The setting of the group selector II.GW and of the connector LW takes place in similar manner.

The connector marker is seized twice successively, corresponding to the tens and units digits to be processed. Thereupon, it causes the relay set RSB to take over the connection, whereby said set immediately after the first testing causes the ringing and calls upon the relay set RSA to connect the line conductors through and to take care of the battery feed for the calling subscriber A in the relay set RSB.

When making a connection from sub-exchange to sub-exchange—subscriber A, for example, calling subscriber D—a transmission to the sub-exchange UAF is seized from a given decade of the group selector I.GW. The successively disposed relay set RSC corresponds functionally to the relay set RSA, from which the trains of dial pulses are conducted, as they arrive, to the pulse repeater in the relay set RSC and are stored, until called for, by the marker ES of the following selection stages. The setting of the toll group selector FGW, of the group selector II.GW and finally of the connector LW takes place in the manner already described.

If on the other hand, the calling subscriber A wishes to make a call over the toll line FL, for instance to the central office FA2 in FIG. 1, then first of all after evaluation of the digit dialed first, that is, a "0," the sub-exchange transmission FU*e*–U is seized via the group selector I.GW and the call is thus connected through to the main exchange FA. The sub-exchange transmission FU*e*–H arranged on the main exchange side furthermore, via a finder selector SW, seizes an idle toll line transmission FL–U*e*, which then controls in known manner the further extension of the respective call.

The seizure of the toll line transmission FL–U*e* causes seizure of the identifying device JD–H. As soon as the sub-exchange transmission FU*e*–H, connected with the toll line transmission which has been seized, is identified, a signal is given over the transmision path FU*e*–H–FU*e*–U which signal causes the identification in the connected sub-exchange UA*x*. The subscriber's number of the sub-exchange, determined by the identifying device JD–U, is extended to the storer SP–SE. The latter is coupled with a transmitter which causes the transmission of the identification result over the transmission paths FU*e*–U–FU*e*–H to the toll line transmission FL–U*e*. The code and connecting number within the corresponding exchange jointly form the number of a subscriber's station within the entire system FA1. Moreover, this internal call number together with the external call number, and the number of incoming counting pulses are retained in a storer co-operating with each toll line transmission until the connection is released. At the end of the conversation, the central printing device PD with the control transmission S*t*–U*e* and the time recorder ZG are in known manner seized. The existing connection is released only after the printing has been effected.

The selector system represented in FIG. 2 and in the upper part of FIG. 2*a* has already been described thoroughly in American Patents Nos. 3,009,021 and 3,078,347. The control transmission FU*e*U shown furthermore in FIG. 2 and also the identifying device JD–U and the storage transmitter SP–SE for the transmission of the identification result to the main exchange are sufficiently well known through the article "Automatic Number Identification and its Application to No. 1 Crossbar, Panel and Step-by-Step Offices" by D. H. Pennoyer, printed in "The Bell System Technical Journal," September 1958, No. 5, vol. 37, pp. 1295 to 1318. An analogous situation holds for the assemblies of the lower part of FIG. 2*a*, which are known, for example, through Patents Nos. 2,740,836, 2,771,510 and 2,775,648, in each case FIG. 2. There the sub-exchange transmission FL–U*e* corresponds to the Ticket-Repeater, the finder selector SW to the Ticket Repeater Finder, the control transmission ST–U*e* to the Tabulator, the time recorder ZG to the Date-Timer Unit and the printing device PD to the Ticket Tape Punch or to the Record Tape Punch. See for example, also the description starting with line 57 in col. 2 of Patent No. 2,775,648.

FIG. 3 shows a known identifying device with toroidal core evaluation field or panel AF and alternating current signal transmission over the line conductors, as well as one of the subscriber stations within the system of the main exchange and a sub-exchange transmission FU*e*–H with the connecting lines to the toll line transmission FL–U*e*1 and FL–U*e*2, respectively. The toroidal core evaluation field AF comprises a toroidal core matrix which is, corresponding to the three-digit call numbers, divided into three columns H, Z and E corresponding to the hundreds, tens and units digits as well as into ten lines corresponding to the ten different digit values per decimal place. In normal or resting condition, the individual toroidal cores are short-circuited over the contacts *h, z* and *e* and thus are not capable of transmission. The subscriber stations to be identified, for instance 211, and sub-exchange transmissions, for instance FU*e*–H21, are appropriately connected to the main distributor V*h* at marking points for instance T211 and U21. The evaluation loops, for instance AS211 and AS21, connected over decoupling capacitors, for instance C211 and C21, with said marking points, are controlled in known manner by simple threading through the toroidal cores corresponding to the associated core numbers, for instance the evaluation loop AS211 with the toroidal cores H2, Z1 and E1. The connecting of the signal receivers S1 to S0 is controlled by the connecting chain ASK.

The general operation of this known identifying device may first be briefly explained in connection with the subscriber station 211:

The seizure of the identifying device by the calling toll line transmission FL–U*e*, causes the closure of the corresponding evaluation loop AS211 by the identification contacts *id*11 and *id*12 by way of the generator G, and starting of the operation of the connecting chain ASK. The release of the toroidal cores lying in column H and the operative connecting of the signal receivers S1 to S0 is effected via the contacts *h* which are actuated incident to the first switching step.

The result obtained is supplied via the translator or repeater U to the storer S*p* and also to the common control device KE. Simultaneously with the setting of the connecting control circuit ASK, there takes place the setting of the control circuit ESK for the digit-true feeding into the storer. If the result recorder by the signal receiver is definite—only one of the signal receivers has recorded a signal—then the switching of the connecting chain to the next testing step is effected by the control device KE.

This known type of operation is modified in accordance with the present invention insofar as at the start of the identification, it is determined whether a checking of all decades or only the checking of a limited number of decades of the toroidal core evaluation panel AF is necessary to determine the code of a sub-exchange transmission. The determination as to this checking is made by the marking devices KZ in accordance with the invention, with which are connected the evaluation loops, for instance AS21, associated with the sub-exchange transmissions FU*e*–H.

In the embodiment in accordance with FIG. 3, this marking or characterizing device comprises the toroidal core UAK2 and the signal receiver S which is connected therewith. Parallel to the testing of the highest decade of the toroidal core evaluation panel AF, in the example the decade H, the sub-exchange core UAK2 is released by another contact *h*. The signal receiver S is thereupon activated, since a sub-exchange transmission connected with such core is to be identified, and there is effected, coincident with the transfer of the result recorded by the signal receivers S1 to S0 to the control device KE, the determination of the maximum number of testing steps to be carried out in the connecting chain ASK, under control of the signal receiver S. In the embodiment shown, therefore, in the case of the sub-exchange transmission FU*e*–H21, the identification is interrupted after the testing of the decade Z.

The evaluation loops of sub-exchange transmissions with only one code number are connected correspondingly with another characterizing device which would interrupt the identifying process already after the testing of the first decade H.

FIG. 4 shows another embodiment of the invention. The identifying device which is indicated merely schematically by the toroidal core evaluation field AF corresponds to that of FIG. 3. Differing from the previous embodiment, the signal circuit extends during the identifying operation, similar to a circuit arrangement already proposed, from one terminal 1 of the generator G over the private or *c*-conductor connected at the time, of the connection line and the corresponding evaluation loop to the other terminal 2 of the generator.

Only one single evaluation loop, for instance AS211, is provided for every possible combination of digits of the toroidal cores of the toroidal core evaluation field AF. All characterizing points, for instance U21, of the sub-exchange transmissions, for instance FU*e*–H21, are connected with the beginning of the same initial sequence of digits, for instance 2–1, corresponding to the evaluation loop, for instance, the characterizing points U21 and T211 are connected with the evaluation loop AS211.

The individual characterizing points are connected via decoupling elements, for instance G–U21 and G–T211, to the corresponding common evaluation loop, in order to prevent upon identification of a subscriber station, for instance 211, the operative actuation of the characterizing device KZ coupled likewise with such evaluation loop.

In the embodiment shown in FIG. 4, there are provided as decoupling elements, resistances which are dependent on the direction of the current, in the form of rectifiers. In the same way, voltage-dependent resistors in the form of glow lamps or the like can also be used.

Transistors with serially disposed relay, or similar evaluation devices, can likewise be used in place of the characterizing device constructed as toroidal core with serially connected signal receiver.

Changes may be made within the scope and spirit of the appended claims which define what is believed to be new and desired to have protected by Letters Patent.

We claim:

1. A circuit arrangement for automatic charge metering in telephone systems comprising main and sub-exchanges, identifying devices respectively cooperatively associated individually with individual exchanges, and sub-exchange transmissions arranged at the main exchange and carrying the traffic from and to the individual sub-exchanges, an identifying device disposed at the main exchange at which printed records are made of charges for calls, for determining said transmissions as well as subscriber stations of the main exchange, means responsive to identification of sub-exchange transmission for effecting the determination and transmission of the calling subscriber station applicable within the respective sub-exchange, marking points allocated respectively to the individual sub-exchange transmissions within the identification device, which is allocated to the main exchange, said marking points being connected with a further characterizing device for so effecting the operational control of the identification device that there is ascertained only the number of digits of the number characterizing the respective sub-exchange which has been determined by the characterizing device.

2. A circuit arrangement according to claim 1, comprising a plurality of characterizing devices corresponding in number to the different number of places of the individual sub-exchange codes, and means for connecting with the same characterizing device the marking points allocated to the sub-exchange transmission with the same number of places.

3. A circuit arrangement according to claim 1, for use in connection with identifying devices provided with toroidal core evaluation fields, wherein evaluation loops, which are fixedly allocated to the respective individual marking points, are linked with toroidal cores in accordance with the respective call numbers, and wherein the identification signal is extended over the line conductors in the form of an alternating current, thereby characterized that the evaluation loops connected with the marking points which are allocated to the respective sub-exchange transmissions, are linked with the respective toroidal cores corresponding to the number of places of the sub-exchange code number of the evaluation field in a similar manner as the evaluation loops of the subscriber stations combined in the main exchange are linked with the corresponding toroidal cores.

4. A circuit arrangement according to claim 1, for use in connection with identifying devices provided with toroidal core evaluation fields, in which evaluation loops in accordance with the corresponding call number which are in fixed associated with the individual characterizing points are connected with toroidal cores and in which the identifying signal is passed simultaneously over the line conductors or over a private conductor, of the connecting line, characterized thereby that for the distinguishing characterization of the subscriber call numbers of the main exchange and of code numbers of the sub-exchange transmissions of, in each case, the same initial sequence of digits, there is provided only a single evaluation loop in the toroidal core evaluation field, and decoupling elements connecting the characterizing points identifiable by the common evaluation loop with the corresponding common evaluation loop.

5. A circuit arrangement according to claim 4, comprising voltage-dependent resistors of the class of glow lamps, Zener diodes and the like, constituting said decoupling elements.

6. A circuit arrangement according to claim 4, comprising current direction-dependent resistors of the class of rectifiers, constituting said decoupling elements.

References Cited by the Examiner

UNITED STATES PATENTS 2,955,166 10/1960 McCreary ___________ 179—18

KATHLEEN H. CLAFFY, *Primary Examiner.*

ROBERT H. ROSE, *Examiner.*

H. ZELLER, *Assistant Examiner.*